United States Patent
Gajewski

(10) Patent No.: US 6,745,794 B2
(45) Date of Patent: Jun. 8, 2004

(54) FLOW CONTROL VALVE

(75) Inventor: Thomas Edward Gajewski, North Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 53 days.

(21) Appl. No.: 10/163,298

(22) Filed: Jun. 7, 2002

(65) Prior Publication Data

US 2003/0226603 A1 Dec. 11, 2003

(51) Int. Cl.$^7$ ............................................... F16K 11/14
(52) U.S. Cl. .............. 137/630; 137/630.15; 137/599.16
(58) Field of Search ........................... 137/630, 630.15, 137/542, 630.14, 599.16; 251/337

(56) References Cited

U.S. PATENT DOCUMENTS

| 401,647 | A | * | 4/1889 | Foster .................... 137/630.15 |
| 2,753,889 | A | * | 7/1956 | Carr et al. ............. 137/630.15 |
| 3,211,419 | A | * | 10/1965 | Lohr ........................... 251/186 |
| 3,603,344 | A | * | 9/1971 | Stampfli .................. 137/513.3 |
| 3,624,753 | A | * | 11/1971 | Brumm ................. 137/630.14 |
| 3,719,322 | A | * | 3/1973 | Gifford ....................... 236/102 |
| 5,172,722 | A | * | 12/1992 | Nishimura ............. 137/599.16 |
| 5,301,714 | A | * | 4/1994 | Johnson .................. 137/599.16 |
| 5,313,801 | A | | 5/1994 | Bonney ....................... 62/51.2 |
| 5,626,030 | A | * | 5/1997 | Nagai ......................... 62/324.6 |
| 5,657,962 | A | * | 8/1997 | Neron et al. ........... 251/129.15 |
| 6,012,300 | A | * | 1/2000 | Tomatsu et al. .............. 62/222 |
| 6,289,932 | B1 | * | 9/2001 | Thackeray et al. .... 137/630.15 |
| 6,309,033 | B1 | * | 10/2001 | Zaviska .................. 303/119.2 |
| 2001/0032678 | A1 | * | 10/2001 | Bircann et al. ........ 137/630.14 |

* cited by examiner

Primary Examiner—Ramesh Krishnamurthy
(74) Attorney, Agent, or Firm—David M. Rosenblum

(57) ABSTRACT

A valve assembly in which a primary valve is provided within a primary passageway of a valve housing to control flow rates of a fluid flow within the primary passageway. The primary valve is moved between open and closed positions relative to a valve seat defined in the primary passageway to produce higher flow rates as the primary valve is moved towards the open position and lower flow rates as the primary valve is moved towards the closed position. As the primary valve is moved towards the closed position an ever increasing flow rate occurs within a secondary passageway formed in the primary valve by at least an orifice. A secondary needle valve, projecting into the orifice, meters such ever increasing flow rate and thereby the lower flow rates of the fluid flow. The secondary needle valve can be attached to the valve housing and thus, be fixed in position or can be attached to a valve steam to control the degree to which the secondary needle valve projects into the orifice.

2 Claims, 4 Drawing Sheets

FLOW CONTROL VALVE

FIELD OF THE INVENTION

The present invention relates to a flow control valve to control the flow of a fluid within a passageway formed within a valve housing. More particularly, the present invention relates to such a flow control valve in which higher flow rates of the fluid is controlled by a primary valve and lower flow rates are controlled by a secondary needle valve positioned to project into an orifice of a secondary passageway formed within the primary valve.

BACKGROUND OF THE INVENTION

The prior art has provided many different flow control valves to control the flow of a fluid. Typically, flow control valves have a valve to control the flow of the fluid within a passageway of a valve housing. A valve stem connected to the valve moves the valve between an open position, spaced from a valve seat, to allow flow within the passageway and a closed position, seated against a valve seat, to cut off flow within the passageway. As may be appreciated as the valve moves towards the closed position, it becomes increasingly more difficult to precisely control the flow of the fluid because increasingly smaller movements of the valve stem are necessary for such purposes.

Precise flow control, throughout the entire range of valve movement, is necessary in many applications of flow control valves. This is especially true for those processes in which flow requirements are different during start up and steady-state operation. An example of such a process involves cryogenic refrigeration.

In cryogenic refrigeration, cool down of the equipment requires a large flow through a throttling valve. This allows the equipment to be cooled to operating temperature in a reasonable length of time. However, after the operating temperature is reached, a much smaller flow is required that must be precisely controlled. Typically, two valves are employed in parallel for such purposes, a globe valve and a needle valve. The globe valve is used to control flow of the refrigerant for the higher flow rates required during cool down. When normal operating temperature is reached, the globe valve is closed and the needle valve is used for precise control of the lower flow rate of the refrigerant.

As may be appreciated, the provision of two different valves in the same flow circuit is not an attractive solution from the standpoint of cost and complexity. As will be discussed, the present invention provides a single flow control valve that is capable of handling a wide range of flow rates with precise control of lower flow rates occurring near valve closure.

SUMMARY OF THE INVENTION

The present invention provides a flow control valve to control fluid flow. In accordance with the present invention, the valve includes a valve housing having a primary passageway for the fluid flow. Flow is controlled within the primary passageway by a primary valve operable for movement between a closed position against a valve seat located within the primary passageway and an open position spaced from the valve seat. This action controls flow rate of the fluid flow between lower flow rates, as the primary valve is moved toward the closed position and higher flow rates, as the primary valve is moved towards the open position. A secondary passageway, formed at least by an orifice, is situated within the primary valve to allow for an ever more increasing passage of the fluid flow through the primary valve as the primary valve is moved towards the closed position. A secondary needle valve projects into the orifice and thereby meters the ever more increasing passage of the fluid flow within the secondary passageway. A valve stem is provided to move the primary valve between the open and closed positions and to regulate the degree to which the secondary needle valve projects into the orifice, thereby to control the ever more increasing passage of the fluid flow and therefore, the fluid flow at the lower flow rates.

The present invention provides a single flow control valve to do away with the need for two different valves and associated flow circuitry to adjust flow at both high and low flow rates. The secondary needle valve allows for precise metering the fluid flow at the low flow rates. As will be discussed, the actuation of the secondary needle valve can be accomplished in by attachment to the valve stem. In such case, the secondary needle valve is moved to effect its metering function. Alternatively, the secondary needle valve can be attached to the valve housing and thus, be fixed in position. Movement of the primary valve alone thereby produces relative movement between the secondary needle valve and the orifice to meter the lower flow rates.

In one aspect of the present invention, the valve housing has a valve stem barrel. A valve guide, located within the valve stem barrel, is provided with a central opening. The valve stem, at one end, projects through the central opening of the valve guide and has an enlarged head. The primary valve is connected to the valve guide such that the primary valve is spaced from the valve guide with the orifice located opposite to the enlarged head of the valve stem. A spring biases the valve guide against the enlarged head of the valve stem so that movement of the valve stem moves the valve guide and the primary valve. The secondary needle valve is connected to the enlarged head of the valve stem so that when the primary valve is in the closed position, movement of the valve stem adjusts the degree to which the secondary needle valve projects into the orifice.

In accordance with such aspect of the present invention, the spring can be set in compression against the valve guide and a spring retainer connected to the valve stem to bias the valve guide against the enlarged head of the valve stem. Movement of the valve stem and therefore, the secondary needle valve when the primary valve is in the closed position, acts against the bias of the spring.

In a further aspect of the present invention, the secondary needle valve can be connected to the valve housing, within the passageway, so as to be located directly opposite to the orifice and so as to be oriented towards the valve seat. As such, movement of the primary valve by the valve stem adjusts the degree to which the secondary needle valve projects into the orifice.

In accordance with this further aspect of the present invention, the valve housing can be provided with a valve stem barrel. The primary passageway can have a throat located opposite to and aligned with the valve stem barrel. In such aspect, the valve seat is of annular configuration and surrounds the throat of the primary passageway. The primary valve has an enlarged portion, connected to one end of the valve steam. The enlarged portion is configured to slide within the valve stem barrel upon movement of the valve stem, thereby to act as a valve guide. A projecting portion of the primary valve, projects from the enlarged portion such that a ring-like seating surface is defined by an undersurface of the enlarged portion to seat against the valve seat when the primary valve is in the closed position. The orifice is located in the projecting portion.

The projecting portion of the primary valve is configured to fit within the throat of the passageway such that as the primary valve is moved to the closed position, the projecting portion enters the throat of the passageway and the fluid predominantly flows through the orifice. The secondary passageway also has at least one internal passage section communicating between the orifice and an outer surface of the enlarged portion of the primary valve.

The at least one internal passage can communicate between the orifice and a lateral surface of the enlarged portion of the primary valve. In a preferred embodiment, the at least one internal passage section can be an axial section extending from the orifice, towards the enlarged portion of the primary valve. A transverse section can communicate between opposite points of the lateral surface of the enlarged portion of the primary valve so as to intersect the axial passageway section.

As an alternative, the at least one internal passage section can communicate between the orifice and the ring-like seating surface such that the secondary passageway is sealed when the primary valve is in the closed position. In such alternative, the at least one internal passageway section can be provided with an axial section extending from the orifice, towards the enlarged portion. At least two lateral sections communicate between the axial channel and the ring-like seating surface.

In any of the foregoing aspects of the present invention involving connection of the secondary needle valve to the valve housing, the connection can be a threaded connection to allow adjustment of the secondary needle valve.

BRIEF DESCRIPTION OF THE DRAWINGS

While the specification concludes with claims distinctly pointing out the subject matter that Applicant regards as his invention, it is believed that the invention would be better understood when taken in connection with the accompanying drawings in which:

DETAILED DESCRIPTION

Figure 1:
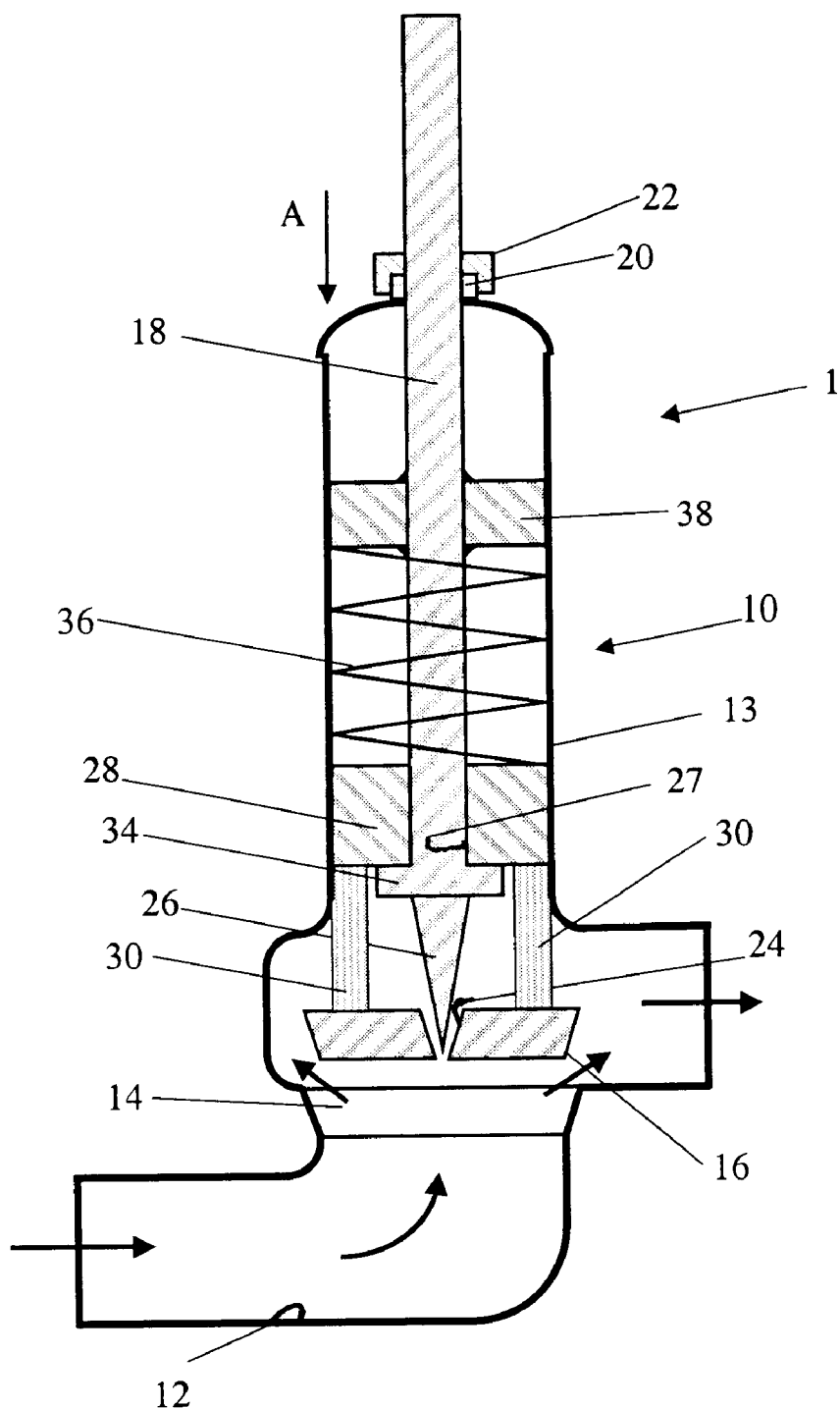
FIG. 1 is a schematic illustration of a flow control valve in accordance with the present invention shown in the open position.

With reference to FIG. 1, a flow control valve 1 in accordance with the present invention is illustrated to control the flow of a fluid illustrated by the arrows. Flow control valve 1 controls the flow of a fluid shown by unlabelled arrows. Flow control valve 1 is provided with a valve housing 10 having a primary passageway 12 and a valve stem barrel 13. Situated within primary passageway 12 is a valve seat 14. A primary valve 16 is located within valve housing 10 to regulate the flow of a fluid within primary passageway.

Figure 2:
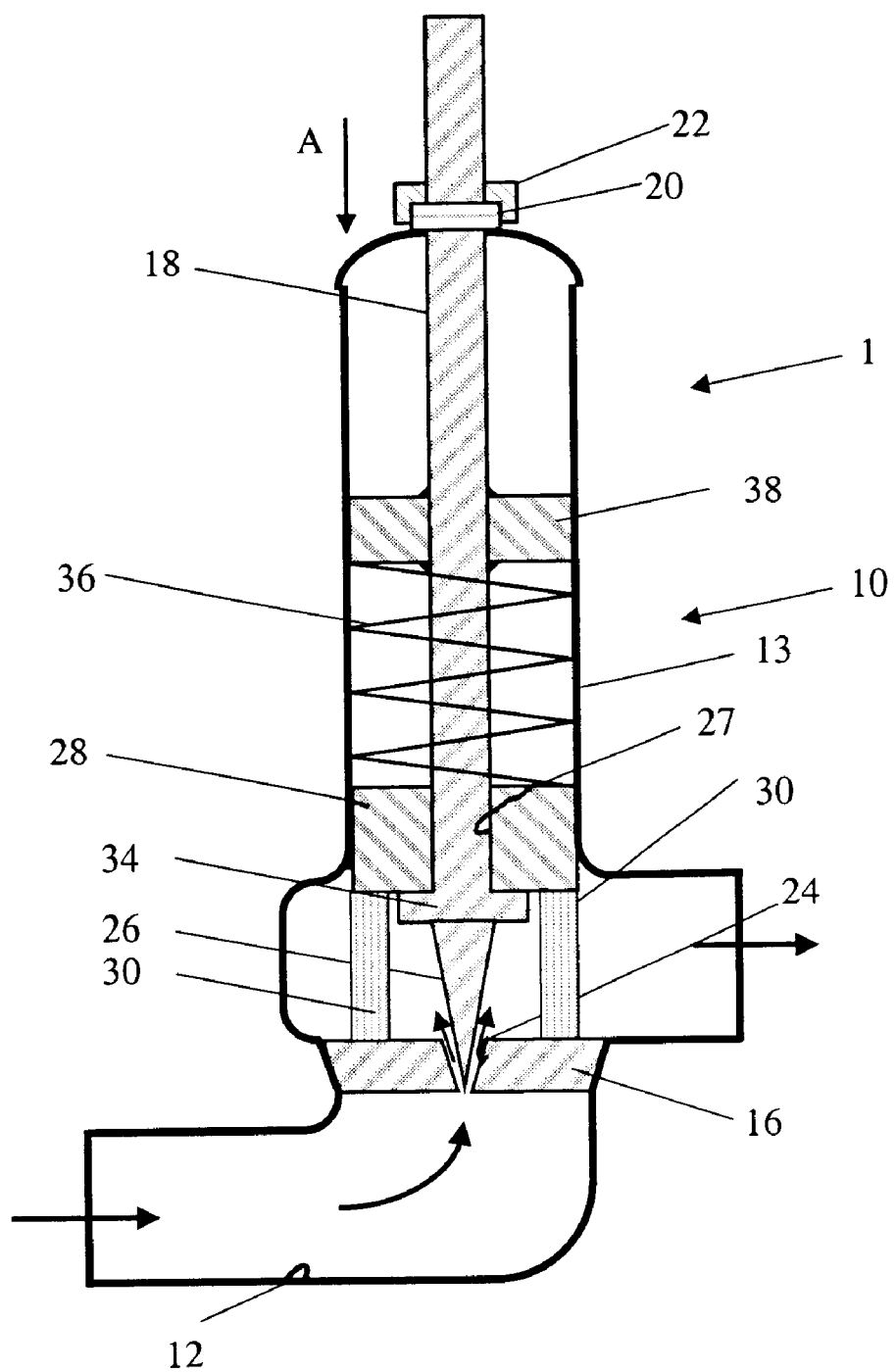
FIG. 2 shows the flow control valve of FIG. 1 in a closed position.

A valve stem 18 is provided to move or operate primary valve 16 between an open position, shown in FIG. 1, and a closed position against valve seat 14, illustrated in FIG. 2. Higher flow rates of the fluid are produced as primary valve 16 moves towards the open position and lower flow rates of fluid are produced within primary valve 16 moves towards the closed position. Valve housing 10 is provided with a seal for valve stem 18 that consists of valve packing 20 and a packing nut 22. Valve stem 18 may be operated by hand such as by a threaded valve wheel or by any one of a known electric or pneumatic motors.

A secondary passageway is defined by an orifice 24 situated within primary valve 16 to allow for regulation of the flow of the fluid at lower flow rates. When primary valve 16 is moved towards its closed position, the flow rate of the fluid through orifice 24 steadily increases as the clearance between primary valve 16 and valve seat 14 decreases. Hence, regulation of the flow rate of the fluid through orifice 24 will provide an accurate control of the fluid flow at low flow rates. Such regulation or metering of such flow through orifice 24 is effectuated by a secondary needle valve 26 to project into the orifice 24.

In the illustrated embodiment, valve stem 18, at one end, projects through a central opening 27 of a valve guide 28. Valve guide 28 moves within valve stem barrel 13 to align primary valve 16 with valve seat 14. Primary valve 16 is connected to valve guide 28 by evenly spaced connecting rods 30 such that primary valve 16 spaced from the valve guide 28 and orifice 24 faces valve stem 18.

Valve stem 18 at the end passing through valve guide 28 has an enlarged head 34 to which secondary needle valve 26 is connected. Valve stem 18 and valve guide 28 preferably have a spring loaded engagement provided by a helical spring 36 set in compression against valve guide 28 by a spring retainer 38. Helical spring 36 biases valve guide 28 in position against enlarged head 34 of valve stem 18 so that movement of valve stem 18 moves valve guide 28 and therefore, primary valve 16.

With specific reference to FIG. 2, when primary valve 16 is seated within valve seat 14 or in fact it is even moved towards valve seat 14 more and more of the flow within primary passageway 12 is constrained to flow through orifice 24. Helical spring 36 ensures that primary valve 16 and valve stem 18 move as a unit. When valve 16 is seated against valve seat 14 all of the flow must pass through orifice 24. The flow can be further adjusted in orifice 24 by continued movement of valve stem 18 in a direction shown by arrowhead "A". Further movement of valve stem 18 in the downward position, against the bias of helical spring 36, progressively moves secondary needle valve 26 into orifice 24 to further decrease the flow through primary passageway 12.

In an appropriately designed valve, movement of valve stem 18 might permit secondary needle valve 26 to seat within orifice 24 to effect a seal and thereby to allow for complete closure of primary passageway 12. Furthermore, although not illustrated, as can be appreciated, a spring (in place of helical spring 36) could be set in compression between the top of valve stem barrel 13 and valve guide 28. In such case primary valve 16 would be biased in the closed position and valve stem 18 would move independently upon valve closure. The disadvantage of such an embodiment is that there would have to be independent control provided for valve stem 18.

Figure 3:
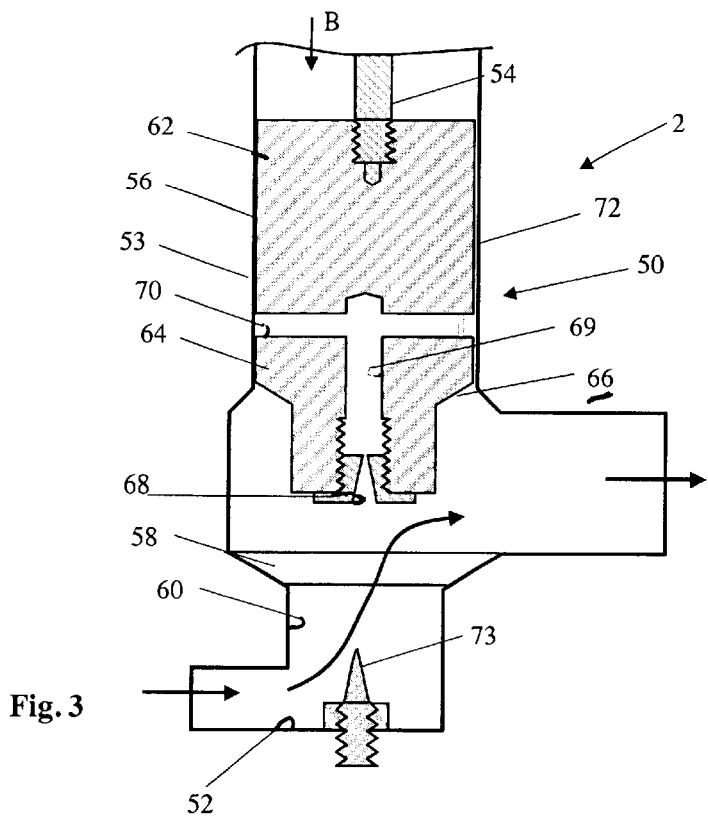
FIG. 3 is a fragmentary, schematic illustration of an alternative embodiment of a flow control valve in accordance with the present invention shown in the open position.

With reference to FIG. 3, a valve assembly 2 is illustrated that constitutes an alternative embodiment of the present invention. The flow of the fluid to be controlled is again shown by unlabelled arrows. Valve assembly 2 is provided with a valve housing 50 having a primary passageway 52 and a valve stem barrel 53. A valve stem 54 projects through valve stem barrel 53 to move a primary valve 56 between an open position and a closed position relative to a valve seat 58. Valve seat 58 is of annular configuration. When primary valve is in the open position, it is spaced from valve seat 58 (FIG. 3). When in the closed position (FIG. 4), primary valve 56 is sealed against valve seat 58.

Primary passageway 52 has a throat 60 located opposite to and aligned with valve stem barrel 53. As illustrated, valve seat 58 surrounds throat 60. Primary valve 56 has an enlarged portion 62 that is configured to slide within valve stem barrel 53 upon movement of valve stem 54. In such manner, enlarged portion 62 acts as a valve guide. Primary valve 56 also has a projecting portion 64, projecting from enlarged portion 62 such that a ring-like seating surface 65 is defined by an undersurface of the enlarged portion 62 to seat against valve seat 58 when primary valve 56 is in the closed position.

A secondary passageway is formed within primary valve 56 by an orifice 68 and an internal passage for the flow of fluid. As illustrated, orifice 68 can be formed as a threaded component that screws into primary valve 56. The internal passage of the secondary passageway can have an axial section 69 extending from orifice 68 towards enlarged portion 62 and a transverse section 70 communicating between opposite points of a lateral surface 72 of enlarged portion 62 so as to intersect axial section 69.

Figure 4:
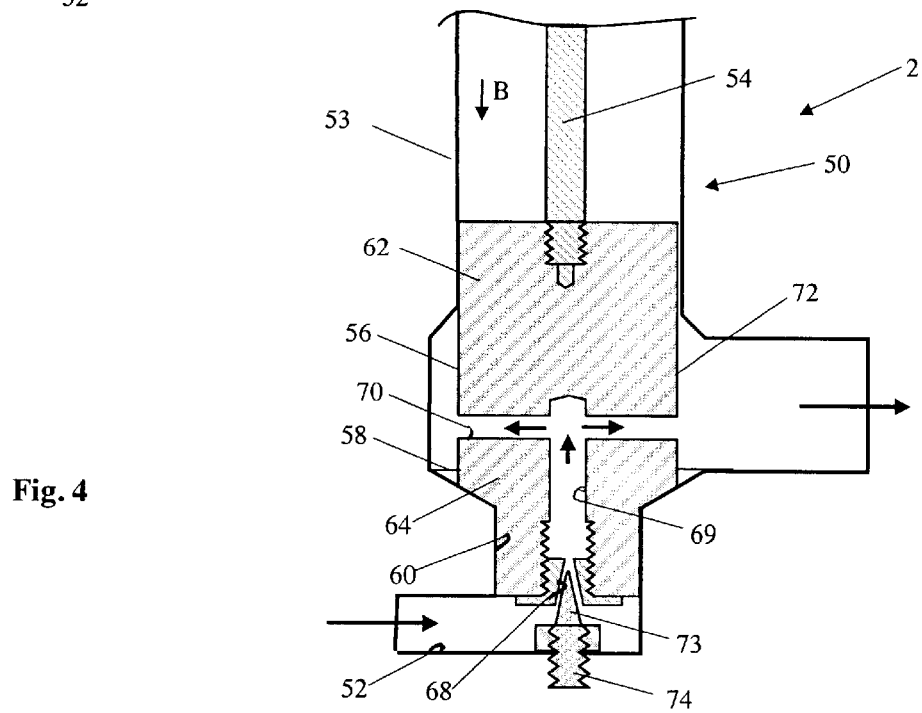
FIG. 4 shows the flow control valve of FIG. 3 in the closed position.

With specific reference to FIG. 4, projecting portion 64 of primary valve 56 is configured to fit within throat 60 of primary passageway 52 such that as primary valve 56 is moved, in a direction shown by arrowhead "B", to its closed position, projecting portion 64 enters throat 60 of primary passageway 52. This causes the fluid to predominantly flow through orifice 68 and therefore axial section 69 and transverse section 70 of the internal passage and out of enlarged portion 62 into primary passageway 52.

Flow within such internal passage is regulated by a secondary needle valve 73 which is connected to valve housing 50, within primary passageway 52, so as to be located directly opposite to orifice 68. Secondary needle valve 73 is oriented towards orifice 68 such that when primary valve 56 moves to the closed position, secondary needle valve 73 enters orifice 68 to regulate the flow. Preferably, secondary needle valve 73 is connected by a threaded connection 74 to allow for adjustment. For instance, secondary needle valve 73 can be adjusted to seat within orifice 68 to cut off the flow of the fluid when primary valve 56 is in the closed position.

Figure 5:
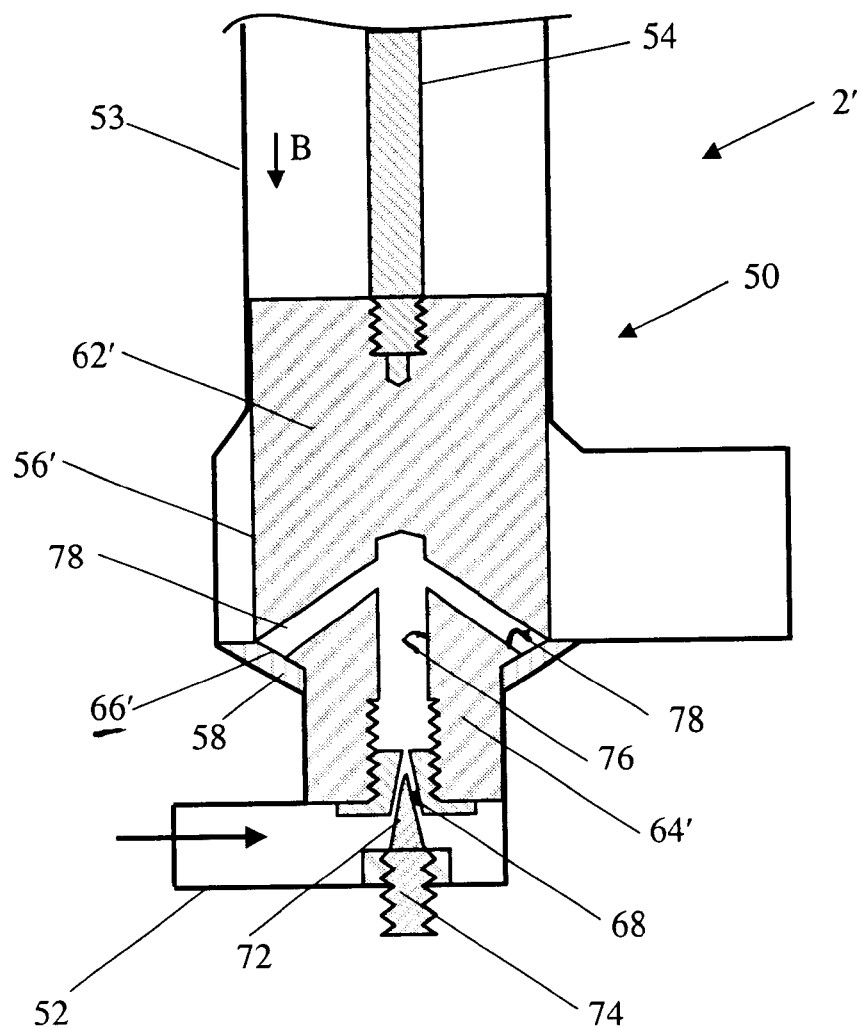
FIG. 5 is a fragmentary, schematic illustration of an alternative embodiment of the flow control valve of FIG. 3.

With reference to FIG. 5, an alternative embodiment of a valve assembly 2 is illustrated as a valve assembly 2'. The same reference numbers will be used for this embodiment as for valve assembly 2 in order to avoid needless repetition. The secondary passageway is formed by an internal passage having an axial section 76 extending from orifice 68, towards the enlarged portion 62' thereof. At least two lateral sections 78 of the internal passage extend from axial section 76 to communicate between ring-like seating surface 66' and axial section 76. Thus, when primary valve 56' is moved to its closed position, flow within the secondary passageway is completely cut off.

As may be appreciated, many modifications of the embodiments illustrated in FIGS. 3, 4 and 5 may be made. In this regard, although preferred, primary valve 56 could have the disk-like configuration of primary valve 16. In such case the internal passage provided for the secondary passageway might be formed by the orifice alone. Modifications to the particular design of the sections of the secondary passageway, for instance, axial section 68 and transverse section 70, are possible. In either valve assemblies 2 or 2', the internal passage of the secondary passageway need only communicate between orifice 68 and an appropriate outer surface of enlarged portion 62 or 62' of primary valve 56 or 56'. Such outer surface would be lateral surface 72 of enlarged portion 62 of primary valve 56 or ring-like seating surface 66' in case of primary valve 56'. In all embodiments of the present invention, the use of valve guides and valve stem barrels are also optional.

Although the present invention has been described with reference to preferred embodiments, as will occur to those skilled in the art, numerous changes, additions and omissions can be made without departing from the spirit and the scope of the present invention.

What is claimed is:

1. A flow control valve to control fluid flow comprising:
   a valve housing having a primary passageway for the fluid flow and a valve stem barrel;
   a valve guide located within said valve stem barrel and having a central opening;
   a valve seat located within said primary passageway;
   a primary valve operable for movement between a closed position against said valve seat and an open position spaced from said valve seat to control flow rate of the fluid flow between lower flow rates as said primary valve is moved towards the closed position and higher flow rates as said primary valve is moved towards said open position;
   a secondary passageway defined at least by an orifice situated within said primary valve to allow for an ever more increasing passage of said fluid flow through said secondary passageway as said primary valve is moved towards said closed position;
   a secondary needle valve to project into said orifice and thereby to meter the ever more increasing passage of fluid flow within said secondary passageway;
   a valve stem to move said primary valve between said open and closed positions and to regulate a degree to which said secondary needle valve projects into said orifice, thereby to control the ever increasing passage of fluid flow and therefore, the fluid flow at the lower flow rates;
   said valve stem, at one end, projecting through said central opening and having an enlarged head;
   said primary valve connected to said valve guide such that said primary valve is spaced from said valve guide with said orifice located opposite to said enlarged head of said valve stem;
   said secondary needle valve connected to said enlarged head of said valve stem so that when said primary valve is in the fully closed position, movement of the valve stem adjusts the degree to which said secondary needle valve projects into said orifice; and
   a spring to bias said valve guide against said enlarged head of said valve stem so that movement of said valve stem moves said valve guide and said primary valve.

2. The valve of claim 1, wherein:
   said spring is set in compression against said valve guide and a spring retainer connected to said valve stem to bias said valve guide against said enlarged head of said valve stem; and
   movement of said valve stem and therefore said secondary needle valve when said primary valve is in the closed position acts against said bias.

* * * * *